Nov. 30, 1926.

O. BODEN 1,609,053

AXLE BRACE FOR CANTILEVER SPRING VEHICLES

Filed Nov. 30, 1925

Oliver Boden
By Clarkson

Patented Nov. 30, 1926.

1,609,053

UNITED STATES PATENT OFFICE.

OLIVER BODEN, OF BIRMINGHAM, ENGLAND.

AXLE BRACE FOR CANTILEVER-SPRING VEHICLES.

Application filed November 30, 1925, Serial No. 72,224, and in Great Britain October 31, 1924.

When front wheel brakes are fitted to vehicles which are suspended from the front axle through what are known as cantilever or quarter-elliptic springs, means have to be provided for preventing the turning of the axle under the brake re-action, the spring itself, as usually constructed, being insufficient for this purpose, inasmuch as it is liable under the strain, to buckle at the point where it connects to the axle, there being usually only a single leaf or at most two leaves at such point.

According to this invention, a substantially horizontal strut, tie rod or plate is connected at one end to some fixed part of the vehicle at a distance from the axle, and the other end is connected to the axle (or to an upward or downward extension thereof) at a point which is a distance above or below the points on the axle to which the ends of the springs are connected.

Assuming the tie rod connects to the axle (or to an upward extension thereof) at a point which is above the points where the springs connect, then the effect of the brake re-action in a forward direction, in the case of front wheel brakes, is to put the tie rod in tension and produce a corresponding endway compression stress on the spring itself. If the brakes are applied when the vehicle is moving backwards the tension comes lengthwise on the leaves of the spring, and a compression strain is put upon the tie rod.

As will be readily understood various arrangements may be adopted within the scope of the invention, two of such being described with reference to the two figures of the drawings each of which represents a view of a spring suspension in side elevation.

Figure 1:
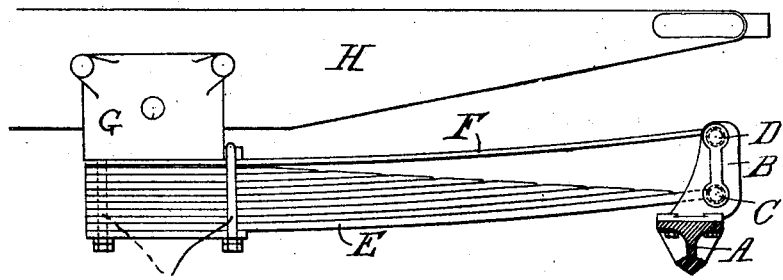

Referring first to Figure 1, A is the axle (shown in section) and B an upward extension rigid therewith. This upward extension is provided with two pivot axes C and D. The outer end of the spring E is pivoted to the axis C in the usual way, while a plate or leaf F is pivoted at its outer end to the axis D, its inner end being clamped between the inner end of the spring E and the spring bracket G provided with a flat under surface, which bracket is rigidly mounted on the chassis frame H as by clamping bolts I.

Figure 2:
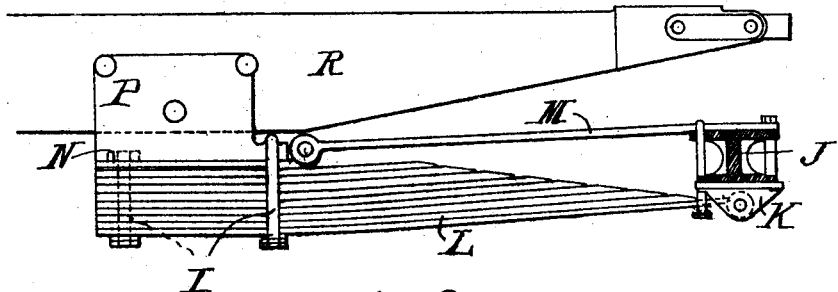

Referring to Figure 2, J is the axle having a downward extension or bracket K to which the outer end of the spring L is pivoted in the usual way. M is a plate or leaf which at its outer end is clamped to the top of the axle and pivoted at its inner end to a plate N which is clamped between the inner end of the spring and the spring bracket P which is rigid with the chassis frame R.

In either modification the action of the plate F or M is the same acting as a tension member in taking forward brake re-action while the spring itself acts as a compression member.

Provided that the plate is flexible, both of its connections, that is with the bracket and with the axle, may be rigid connections.

Although it is preferred to employ a strut in respect of each spring of an axle, a single strut may be employed in respect of each axle.

Having fully described my invention, what I claim and desire to secure by Letters Patent is:—

In combination, a spring seat having a flat under surface, a multiple leaf spring having one end below the seat, a resilient tie member having one end between the seat and the spring and projecting in the same direction as the spring, means to secure the spring to its seat and clamp the end of the tie member in position, an axle, a spring bracket mounted on top of the axle, a pivot bolt extending through the bracket adjacent and above the axle and having the free end of the spring engaged therewith, and a second pivot bolt extending through the bracket at a point above and more remote from the axle than the first bolt and having the free end of the tie member engaged therewith.

In witness whereof I have hereunto signed my name this 12th day of October, 1925.

OLIVER BODEN.